Nov. 7, 1939.  C. L. HAHN  2,178,905
ROLLER SPRING ALIGNMENT CLAMP
Filed April 17, 1939   2 Sheets-Sheet 1
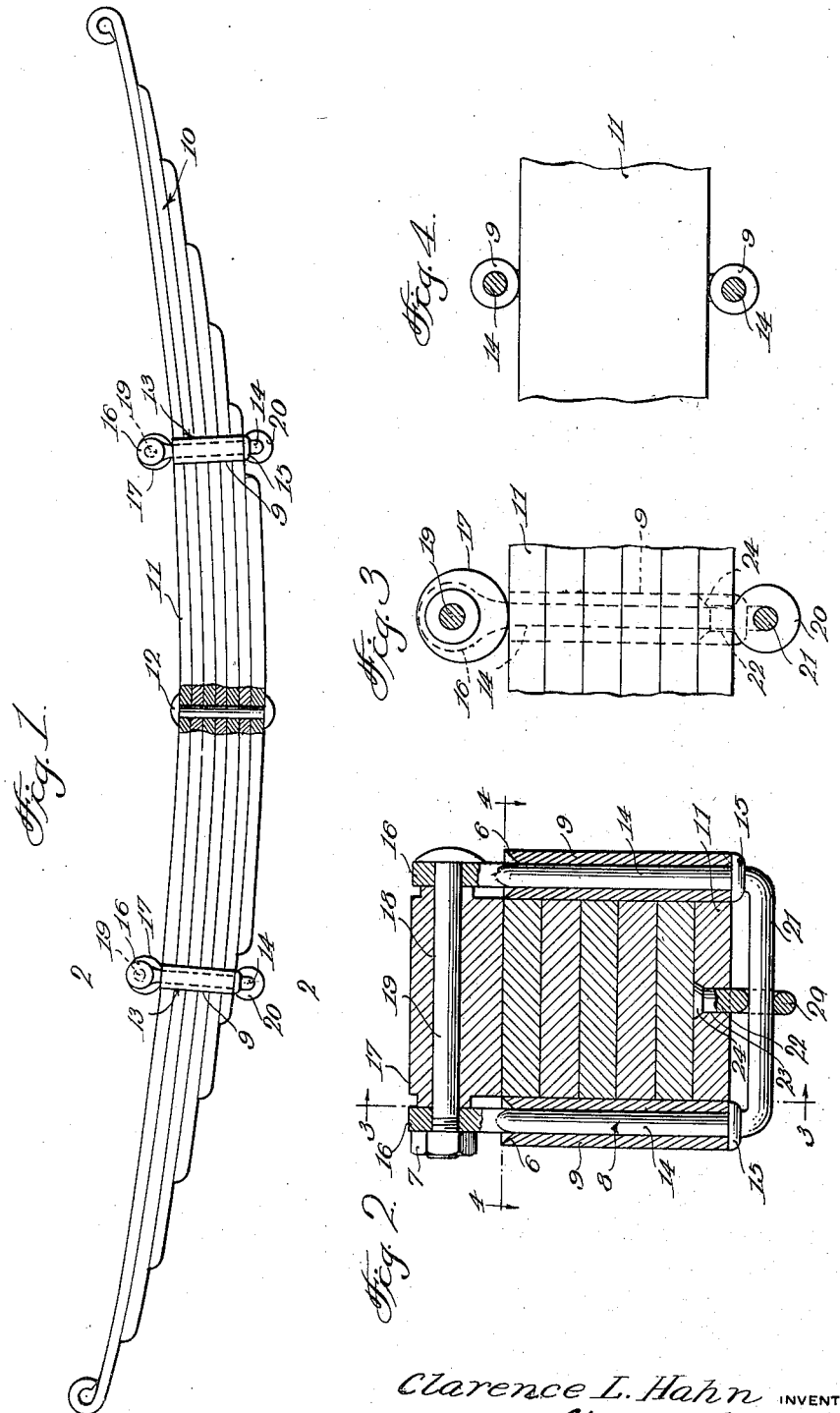
Clarence L. Hahn INVENTOR
BY Victor J. Evans & Co.
ATTORNEY Nov. 7, 1939.  C. L. HAHN  2,178,905
ROLLER SPRING ALIGNMENT CLAMP
Filed April 17, 1939  2 Sheets-Sheet 2
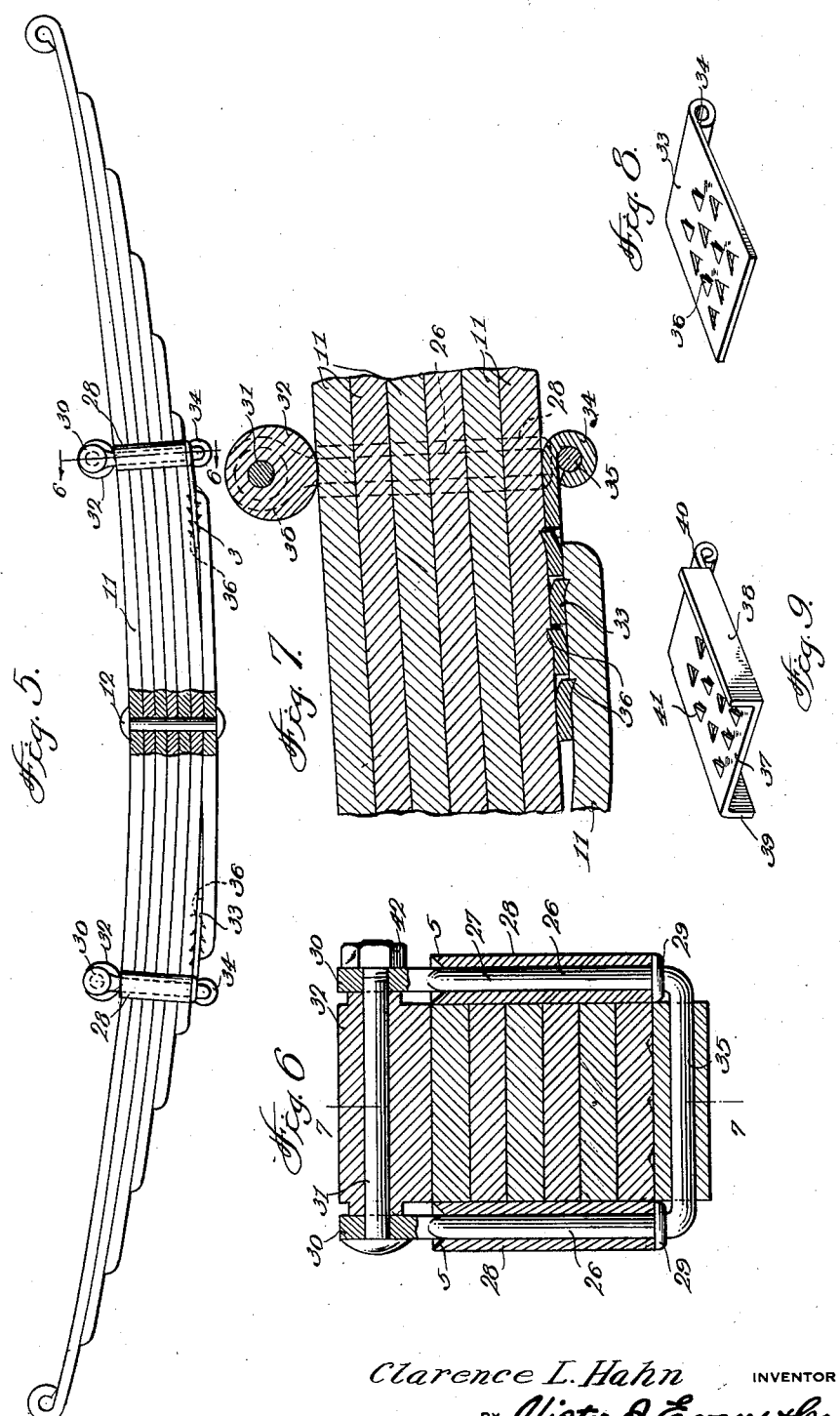
Clarence L. Hahn  INVENTOR
BY Victor J. Evans & Co.
ATTORNEYS Patented Nov. 7, 1939

2,178,905

UNITED STATES PATENT OFFICE 2,178,905

ROLLER SPRING ALIGNMENT CLAMP

Clarence L. Hahn, Baltimore, Md.

Application April 17, 1939, Serial No. 268,371

8 Claims. (Cl. 267—53)

This invention relates to roller spring alignment clamps and has for an object to provide a clamp having an eccentric roller at the top adapted to follow flexing movement of any plate or leaf spring, wherever used, and exert a pressure on the top of main leaf, which pressure is in turn exerted on all the leaves under the main leaf, thus keeping the leaves tightly pressed together, to prevent broken spring leaves.

A further object is to provide a clamp of this character having side rollers adapted to engage the sides of all of the leaves and hold the leaves in alignment at all times, thus eliminating breakage due to torque.

A further object is to provide side rollers beveled at the top to prevent the roller from coming into contact with the bearing eyes of the clamp and assure freedom of the side rollers at all times, and also to form oil cups to receive a lubricant for lubricating the side rollers.

A further object is to provide a clamp of this type which can be easily applied to used cars as well as to cars in the course of manufacture, without the use of special tools, which will be formed of a few strong, simple and durable parts, which will be inexpensive to manufacture and which will not easily get out of order under severe conditions of service.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a side elevation of a conventional plate or leaf spring equipped with a pair of clamps constructed in accordance with the invention.

Figure 2 is a cross sectional view of one of the clamps, taken on the line 2—2 of Figure 1 and drawn to large scale.

Figure 3 is a detail cross sectional view taken on the line 3—3 of Figure 2 showing the eccentric roller.

Figure 4 is a detail cross sectional view taken on the line 4—4 of Figure 1 showing the side rollers.

Figure 5 is a side elevation of a conventional leaf spring equipped with a modified form of clamp.

Figure 6 is a cross sectional view taken on the line 6—6 of Figure 5 showing one of the clamps, drawn to large scale.

Figure 7 is a detail longitudinal sectional view taken on the line 7—7 of Figure 6.

Figure 8 is a perspective view of the toothed apron for anchoring the clamp to the leaf spring.

Figure 9 is a perspective view of another form of toothed apron.

Referring now to the drawings in which like characters of reference designate similar parts in the various views, 10 designates a conventional plate or leaf spring comprising a plurality of leaves 11 asesmbled in superposed relationship through the medium of a headed up pin 12 passed through the centers of the leaves. In carrying out the invention a clamp 13 is arranged to embrace the leaves on each side of the pin 12.

Each clamp comprises a U-shaped member 8 having upright legs 14 provided at the bottom with shoulders 15. The upper ends of the legs are flattened and perforated to provide bearing eyes 16. The two legs 14 have respective rollers 9 sleeved upon them and the rollers are supported at the bottom on the shoulders 15. The rollers are of sufficient length to extend to the top surface of the uppermost leaf of the leaf spring, when the U-shaped member is placed in position to embrace the leaves with the side rollers 9 engaging the side edges of the leaves.

The upper ends of the side rollers 9 are beveled as shown at 6 to prevent the rollers coming in contact with the bearing eyes 16 and thus insure freedom of movement of the side rollers. Also the beveled upper ends of the side rollers form oil cups to receive a lubricant for lubricating the rollers.

An eccentric roller 17 is provided with a longitudinal bore 18 to receive a bolt 19 which is passed through the bearing eyes 16 of the U-shaped member. The nut 7 of the bolt is drawn sufficiently tight against the receptive bearing eye 16 to hold the clamp in place and permit the surface of the eccentric roller 17 following the contour of the upper leaf of the spring during flexing movement of the spring.

The U-shaped member is provided with a ring 20 which loosely receives the cross member 21 of the U-shaped member. The ring is provided with a pin 22 which is adapted to be passed upwardly through an opening 23 in the lowermost leaf spring and headed up as shown at 24 in a countersink in the top face of the leaf to anchor the clamp to the leaf spring. This type of anchor is especially suitable for mounting the clip upon a spring during manufacture of the vehicle.

The U-shaped member pivots in the ring 20 during flexing of the leaf spring to permit the eccentric roller to follow the contour of the uppermost leaf and hold all of the leaves firmly pressed together regardless of severe flexing movement of the spring. Thus breakage, due to separation of the leaves which ordinarily takes place in leaf springs, is eliminated.

Figures 5 to 9 inclusive show a modified form of the invention suitable for use in connection with used cars.

In this form of the invention the legs 26 of the U-shaped member 27 are provided with respective side rollers 28, beveled at the top as shown at 5, and which are supported at the bottom upon collars 29 formed on the legs. The upper ends of the legs are provided with bearing eyes 30 to receive a bolt 31 upon which is sleeved an eccentric roller 32. Instead of using the mounting ring 20 previously described, an apron 33 formed of a flat metal sheet is employed, the same having an eye 34 at one end to receive the cross member 35 of the U-shaped member 27. The apron is provided with rows of struck up teeth 36 on both sides, the teeth on one side pointing in the opposite direction from the teeth on the other side to prevent the apron from creeping in either direction by creating friction between the teeth and the adjacent surfaces of the leaves.

In Figure 9 there is shown a modified form of apron 37, the same having a turned up longitudinal flange 38 on one side and a turned down longitudinal flange 39 on the other side. The apron is equipped at one end with a bearing eye 40 and is provided with rows of struck up teeth 41 on both the top and the bottom face.

To apply the modified form of clamp, the hanger bolts (not shown) of the leaf spring are loosened and a wedge or any sharp instrument is inserted between the lowermost leaf and the upper leaves to pry said leaves far enough apart to permit the apron to enter between. The instrument is then removed to allow the leaves to close upon the toothed apron. Then by rocking the U-shaped member upwardly the legs of the clamp are disposed in position to receive the eccentric roller 32. The eccentric roller is adjusted so that the high side is at the top and the low side is resting on the uppermost leaf of the leaf spring. This is the normal position of the roller when the spring is unflexed. Then the nut 42 is tightened on the bolt 31 to adjust the side rollers 28 to lightly engage the edges of the leaves so as to turn freely.

When the anchor 37 is used the upright flange 38 will extend upwardly along the edge of a leaf on one side of the leaf spring and the downturned flange 39 will extend downwardly along the edge of the next lowermost leaf spring on the opposite side of the leaf spring. The two flanges prevent side sway of the leaves and promote permanent alignment of the leaves as well as reduce noise due to flexing movement and other causes.

In both forms of the invention the eccentric roller always follows the travel of the uppermost leaf spring. The spring flexes when the car runs over uneven surfaces, this flexing movement causing the springs to lengthen or flatten out. During this deformed position of the leaves the eccentric roller turns and exerts a strong pressure on the uppermost leaf spring which in turn exerts pressure on all the leaves below it, and thus the leaves are held tightly pressed together. At the same time the side rollers maintain the leaves in proper alignment at all times.

From the above description it is thought that the construction and operation of the invention will be fully understood without further explanation.

What is claimed is:

1. A spring clamp comprising a U-shaped member adapted to embrace the bottom and sides of a spring having a plurality of superposed leaves, means for pivotally securing the member at the bottom to said spring, and an eccentric roller carried by the member adapted to continually engage and maintain a pressure contact with the top surface of the uppermost leaf of the leaf spring when the spring flexes.

2. A spring clamp comprising a U-shaped member adapted to embrace the bottom and sides of a spring having a plurality of superposed leaves, rollers on the sides of the member adapted to engage the sides of the leaf spring, means for pivotally mounting the member at the bottom on the bottom of the leaf spring, and an eccentric roller carried by the member at the top thereof and adapted to continually bear upon the top surface of the uppermost leaf of the leaf spring during flexing movement of the leaf spring.

3. A spring clamp comprising a U-shaped member having upright legs and a cross piece adapted to embrace the sides and bottom of a leaf spring having a plurality of superposed leaves, the upper ends of said legs being provided with bearing eyes, rollers on said legs adapted to engage the sides of the leaves of the spring and maintain the leaves in alignment, means for pivotally anchoring the member at said cross piece to the lower portion of the leaf spring, an eccentric roller adapted to engage the top surface of the uppermost leaf of the leaf spring, and a bolt and nut connecting said eccentric roller to said eyes.

4. A spring clamp comprising a U-shaped member having upright legs and a cross piece adapted to embrace the sides and bottom of a leaf spring having a plurality of superposed leaves, the upper ends of said legs being provided with bearing eyes, rollers on said legs adapted to engage the sides of the leaves of the spring and maintain the leaves in alignment, said rollers having the upper ends beveled to prevent the rollers coming in contact with said bearing eyes and to provide oil cups to receive a lubricant for lubricating the rollers, means for pivotally anchoring the member at said cross piece to the lower portion of the leaf spring, an eccentric roller adapted to engage the top surface of the uppermost leaf of the leaf spring, and a bolt and nut connecting said eccentric roller to said eyes.

5. A spring clamp comprising a U-shaped member adapted to embrace the bottom and sides of a spring having a plurality of superposed leaves, said member having upright legs adapted to extend upwardly along the sides of the leaves of the spring and having a cross piece attached to extend transversely of the underneath face of the lower leaf of the leaf spring, an eye pivotally receiving said cross piece, means for securing said eye to said lowermost leaf, and an eccentric roller carried by the upper ends of said legs adapted to bear continually upon the top face of the uppermost leaf of the leaf spring.

6. A spring clamp comprising a U-shaped member adapted to embrace the bottom and sides of a spring having a plurality of superposed leaves, an anchor plate having an eye pivotally receiving said member, said anchor plate having teeth, said anchor plate being adapted to be wedged between two of the lowermost leaves of the leaf spring for pivotally mounting the U-shaped member on the leaf spring, and an eccentric roller carried by the U-shaped member adapted to bear continually upon the top face of the uppermost leaf of the leaf spring during flexing movement of the leaf spring.

7. A spring clamp comprising a U-shaped member adapted to embrace the bottom and sides of a spring having a plurality of superposed leaves, an anchor plate having an eye pivotally receiving said member, said anchor plate having teeth, said anchor plate being adapted to be wedged between two of the lowermost leaves of the leaf spring, for pivotally mounting the U-shaped member on the leaf spring, said anchor plate having teeth on the top and the bottom face, the teeth of the top face pointing oppositely to the teeth of the bottom face, and an eccentric roller carried by the U-shaped member adapted to bear continually upon the top face of the uppermost leaf of the leaf spring during flexing movement of the leaf spring.

8. A spring clamp comprising a U-shaped member adapted to embrace the bottom and sides of a spring having a plurality of superposed leaves, an anchor plate having an eye pivotally receiving said member, said anchor plate having teeth, said anchor plate being adapted to be wedged between two of the lowermost leaves of the leaf spring for pivotally mounting the U-shaped member on the leaf spring, flanges on the anchor plate adapted to engage the sides of juxtaposed leaves of the leaf spring, and an eccentric roller carried by the U-shaped member adapted to bear continually upon the top face of the uppermost leaf of the leaf spring.

CLARENCE L. HAHN.